US 6,569,070 B1

(12) United States Patent
Harrington et al.

(10) Patent No.: US 6,569,070 B1
(45) Date of Patent: May 27, 2003

(54) SYSTEM FOR CHANGING THE TOOLING CARRIED BY A ROBOT

(75) Inventors: James F. Harrington, Lexington, OH (US); Joseph A. Leaf, Mansfield, OH (US)

(73) Assignee: Dallas Design and Technology, Inc., Lexington, OH (US)

( * ) Notice: Subject to any disclaimer, the term of this patent is extended or adjusted under 35 U.S.C. 154(b) by 0 days.

(21) Appl. No.: 10/040,423

(22) Filed: Jan. 9, 2002

(51) Int. Cl.[7] .............................................. B23Q 3/155
(52) U.S. Cl. ............................... 483/1; 483/13; 483/27; 483/55; 483/901; 901/30; 901/41; 294/86.4
(58) Field of Search ............................ 483/1, 7, 13, 55, 483/54, 56, 27, 62, 901, 902; 901/37, 42, 41, 39, 30; 294/86.4; 414/729

(56) References Cited

U.S. PATENT DOCUMENTS

| | | | | |
|---|---|---|---|---|
| 4,512,709 A | * | 4/1985 | Hennekes et al. ............. | 483/55 |
| 4,641,415 A | * | 2/1987 | Charra ......................... | 483/13 |
| 4,660,274 A | * | 4/1987 | Goumas et al. ................ | 483/7 |
| 4,715,636 A | * | 12/1987 | Wiesner et al. ............ | 294/86.4 |
| 4,993,139 A | * | 2/1991 | Burry et al. .................... | 483/7 |
| 5,101,548 A | * | 4/1992 | McMurtry et al. ............ | 483/62 |
| 5,256,128 A | * | 10/1993 | Neumann ....................... | 483/1 |
| 6,451,027 B1 | * | 9/2002 | Cooper et al. .............. | 606/130 |

* cited by examiner

Primary Examiner—William Briggs
(74) Attorney, Agent, or Firm—Renner, Kenner, Greive, Bobak, Taylor & Weber

(57) ABSTRACT

A system for changing a tool head (24) carried by a robot (20) includes a locking mechanism (23) having a keyhole-shaped slot (37) therein, and a lock key assembly (25) having a key (65). Depression of a button (52) rotates a cam arm (57) to extend the key (65) outwardly where it can be received in the larger opening (38) of the slot (37). Depression of the button (35) of the locking mechanism (23) moves the slot (37) such that the neck (68) of the key (65) is received in the smaller opening (39) of the slot (37). Release of the buttons (52, 35) then allows a spring (71) to retract the key (65) until its head (69) is received in a recess (40) of the locking mechanism (23) to attach the tool head (24) to the robot (20). The parts are detached by again depressing the button (52) which extends the key (65) to remove its head (69) from the recess (40) and then depressing a button (34) to move the slot (37) so that the key (65) is again in the larger opening (38) from where it may be removed. The system may be operated manually or operated automatically at a docking station (26).

25 Claims, 10 Drawing Sheets

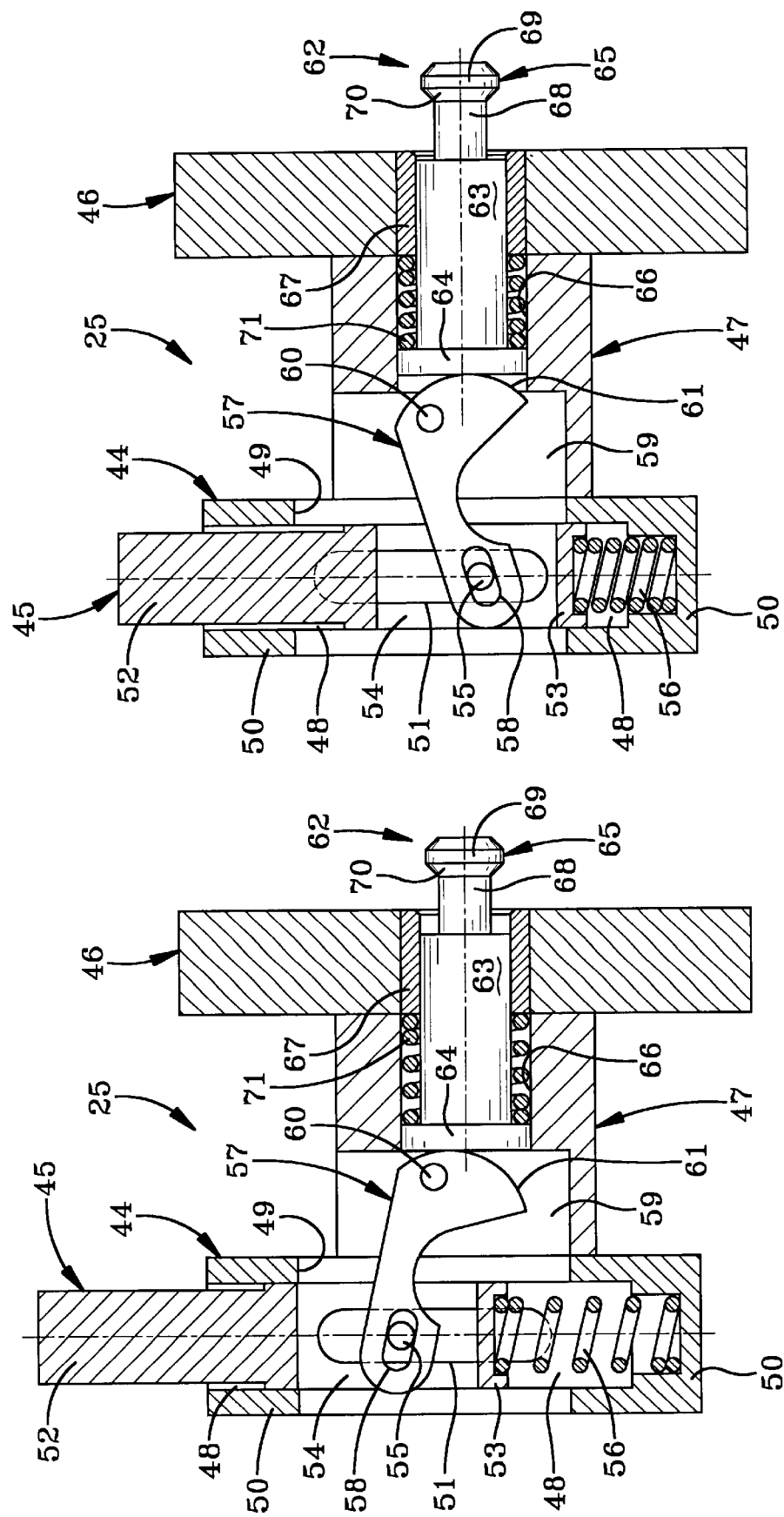

SYSTEM FOR CHANGING THE TOOLING CARRIED BY A ROBOT

TECHNICAL FIELD

This invention relates to a system for changing the tooling carried by the arm of a robot. More particularly, this invention relates to such a system which can be rapidly operated either automatically at a docking station or manually.

BACKGROUND ART

The arm or arms of a robot carry tooling or the like so that a specific operation can be performed on a specific workpiece at a workstation. It is often necessary to change the tooling carried by the robot so that a different operation can be performed by the robot at the workstation or at a new workstation. Historically, when a changing of the tooling was required, a plurality of screws or other fasteners had to be manually removed, which took a great deal of time resulting in down time for the robots. However, it is desirable that the tooling being carried by the robot can be quickly disconnected from the robot and new tooling quickly connected thereto so as to minimize the non-production time of the robot.

One currently known robot tool changing system is typified by that shown in U.S. Pat. No. 4,696,524. There, a coupling device is disclosed which includes an inner assembly attached to the arm of the robot and a mating outer assembly attached to the tool. A piston is carried by the inner assembly and is activated to cause radial movement of a plurality of balls which are mounted in a retainer of the inner assembly beneath a cam ring of the outer assembly such that the assemblies are locked together upon activation of the piston.

Such a system required the manufacture and assembly of a number of components to precise manufacturing tolerances. Thus, such systems were quite expensive and, at times, did not accurately lock the two components. A device shown in U.S. Pat. No. 5,211,501 attempted to improve the system; however, these systems still have their short comings. Specifically, the pneumatic or other power required to attach or disconnect the tooling must be carried by the robot thereby adding weight, costs, and inefficiency to operate the system. Moreover, these systems cannot be manually operated which would be important at least in times of loss of power or failure of the pneumatic operating system.

DISCLOSURE OF THE INVENTION

It is thus an object of the present invention to provide a system which can automatically and quickly change the tooling carried by the arm of a robot.

It is another object of the present invention to provide a system, as above, which may also be manually operated without the need for external power or separate tools.

It is a further object of the present invention to provide a system, as above, which is operable during times of emergency stops at the work area.

It is an additional object of the present invention to provide a system, as above, which can be operated at a docking station which carries the required external power sources for automatic operation of the system.

It is yet another object of the present invention to provide a system, as above, wherein the docking station is provided with the proper tooling by means of the robotic program.

It is still another object of the present invention to provide a system, as above, which is easily and efficiently operated and is less expensive to manufacture and maintain.

These and other objects of the present invention, as well as the advantages thereof over existing prior art forms, which will become apparent from the description to follow, are accomplished by the improvements hereinafter described and claimed.

In general, a system for attaching a tool head to a robot includes a locking mechanism carried by the robot and having a slot movable from a first position to a second position. The tool head includes a key assembly having a key which is positionable in the slot when the slot is in the first position. The key is held in the slot when the slot is in the second position.

The system may be operated manually or automatically by depressing a first button to extend the key to a first position where it may be received by the locking mechanism, then depressing a second button to hold the key at a second position in the locking mechanism, and then releasing the buttons to attach the tool head to the locking mechanism.

A preferred exemplary system for changing the tooling carried by the arm of a robot incorporating the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 5 is a sectional view of a lock key assembly portion of a tool head showing the assembly in a retracted condition.

FIG. 6 is a view similar to FIG. 5 but showing the lock key assembly in an extended condition.

PREFERRED EMBODIMENT FOR CARRYING OUT THE INVENTION

Figure 1:
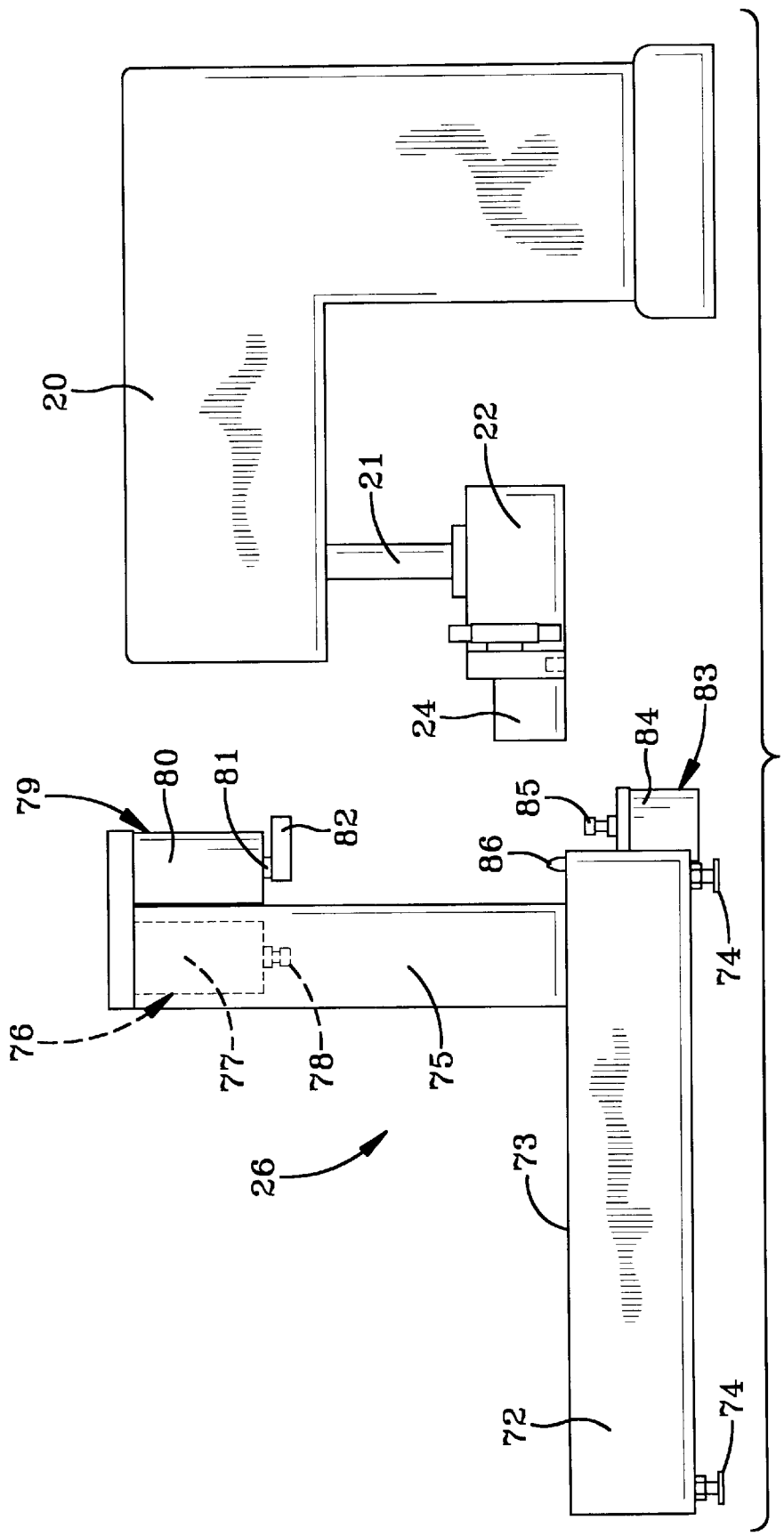
FIG. 1 is a somewhat schematic view of a robot carrying a tool and a docking station where the tool may be removed from the robot.
Figure 2:
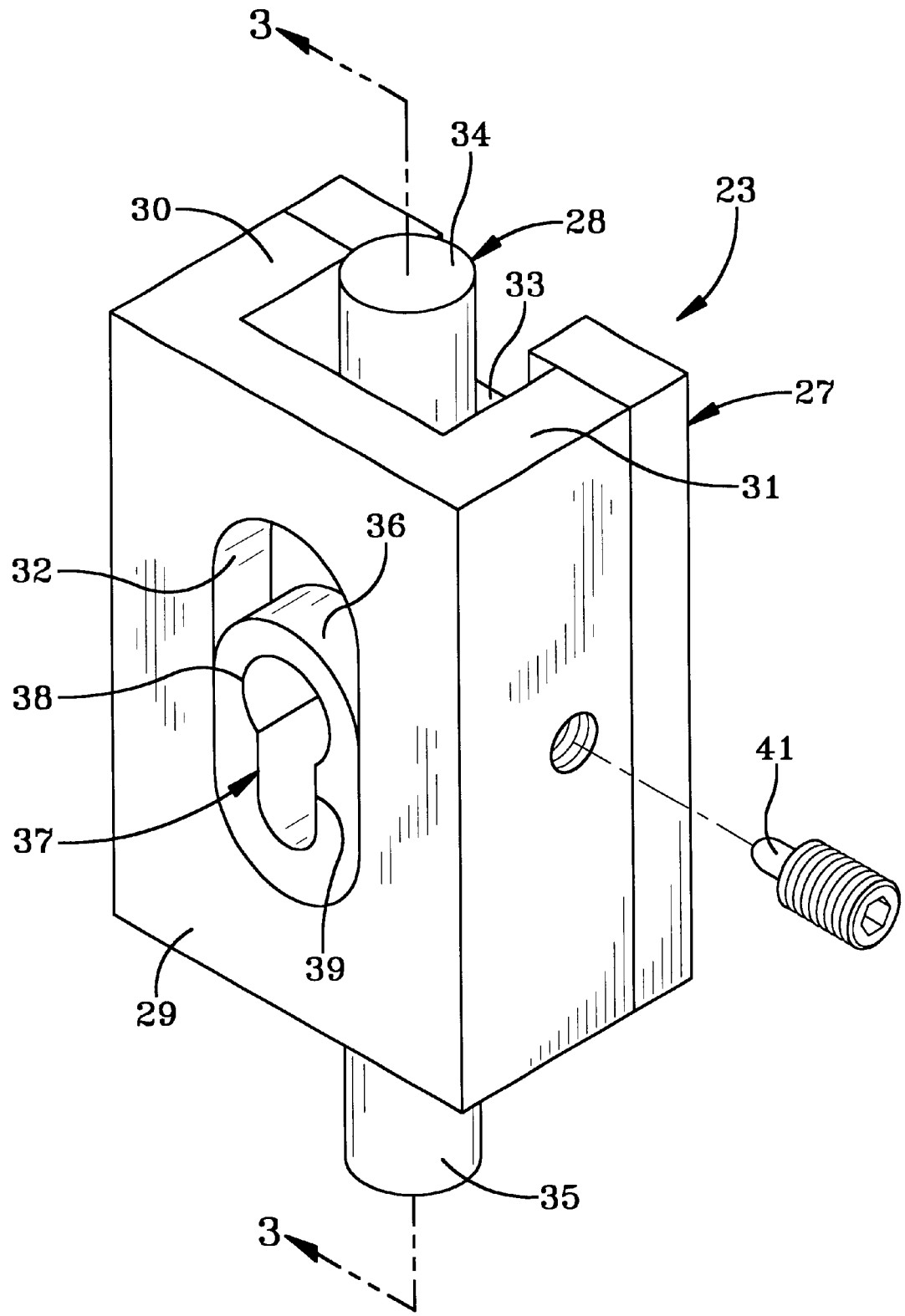
FIG. 2 is a perspective view of a locking mechanism of a master head carried by the robot.
Figure 4:
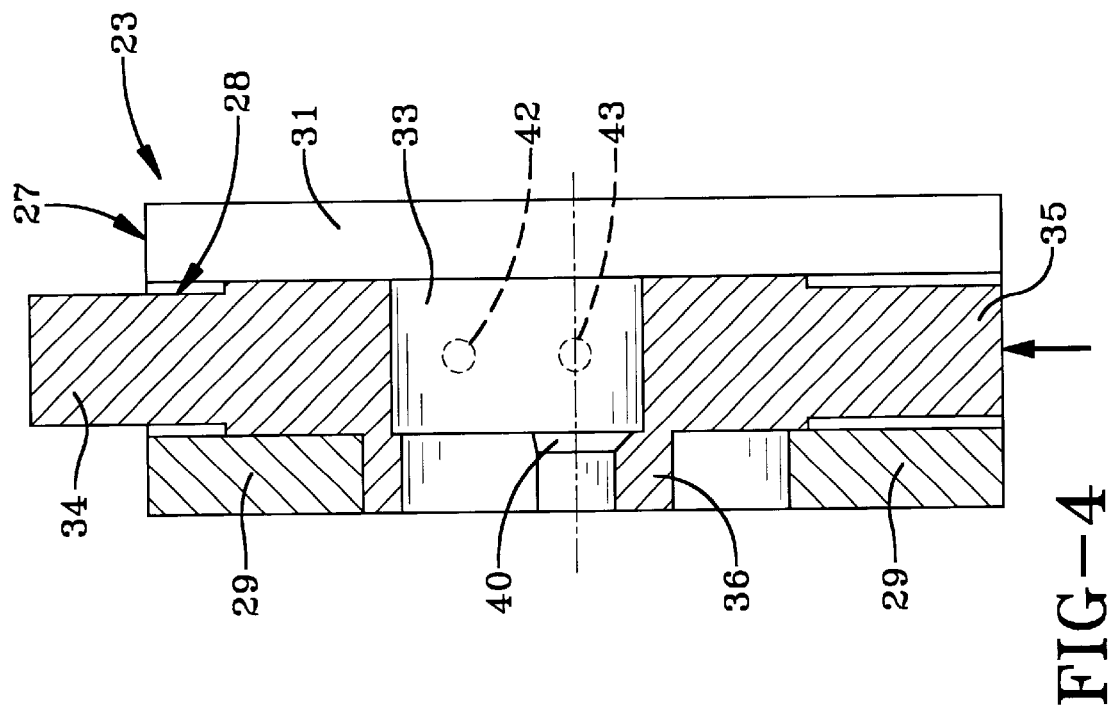
FIG. 4 is a view similar to FIG. 3 but showing the locking mechanism in the locked condition.
Figure 3:
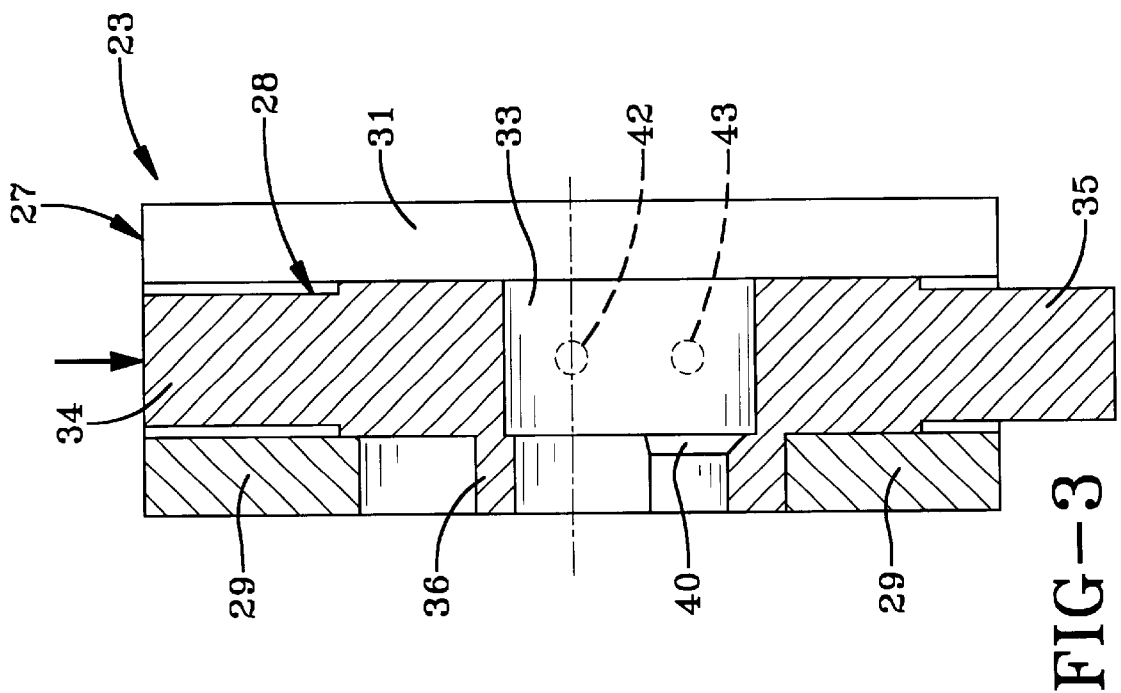
FIG. 3 is a sectional view taken substantially along line 3—3 of FIG. 2 and showing the locking mechanism in the unlocked condition.

Schematically shown in FIG. 1 is a robot 20 having an arm 21 which carries a master head 22 which includes a locking mechanism generally indicated by the numeral 23 and shown in FIGS. 2–4. A tool head 24 is carried by robot arm 21 via locking mechanism 23. Tool head 24 includes the appropriate tooling (not shown) for an operation to be performed by robot 20, and is provided with a lock key assembly generally indicated by the numeral 25 and shown in FIGS. 5 and 6. Tool head 24 may be attached to and/or detached from master head 22 at a docking station generally indicated by the numeral 26. As is well known in the art, the mating surfaces of the master head 22 and tool head 24 provide the means by which the air/vacuum, electrical feeds and the like are joined so that the tooling may be manipulated by the robot.

Locking mechanism 23 is best shown in FIGS. 2–4 and can be made up of several pieces suitably connected, but once assembled, locking mechanism 23 consists of two basic components, a housing generally indicated by the numeral 27 and a lock slide generally indicated by the numeral 28. Housing 27 is generally u-shaped in plan having a face plate 29 carrying opposed, spaced arms 30, 31 at the ends thereof. Plate 29 constitutes the surface which mates with tool head 24, as previously described, and has a generally centrally located, vertically extending aperture or window 32 therein. Lock slide 28 is an elongate member having a central portion 33 with an upper button 34 extending from one end thereof and a lower button 35 extending from the other end thereof. Buttons 34 and 35 can be integrally formed with central portion 33 or can be separately formed and attached to central portion 33 by appropriate fasteners. A hub 36 extends laterally outward from central portion 33 and includes a keyhole-shaped slot, generally indicated by the numeral 37. Slot 37 thus includes an opening 38 of a larger diameter which opens into an opening 39 of a smaller dimension. The inner edge of smaller opening 39 is provided with a beveled recess 40.

Lock slide 28 is slidably received between arms 30 and 31 of housing 27, and hub 36 of lock slide 28 is received through window 32 of housing 27 for vertical reciprocation within window 32. As a result, keyhole-shaped slot 37 is exposed through window 32. Lock slide 28 is moved relative to housing 27 by applying a force to either button 34 or 35, and is maintained in the desired position by a spring biased ball plunger 41 carried by at least one of the arms 30, 31. Plunger 41 is received in one of two detents 42, 43 formed in at least one side of central portion 33 of slide 28. When slide 28 is in the down position shown in FIG. 3, pressure having been applied to top button 34, plunger 41 is in detent 42 to maintain that relative position between slide 28 and housing 27. When in this position, by applying upward pressure on lower button 35, the bias on plunger 41 may be overcome to allow lock slide 28 to move to the FIG. 4 position where plunger 41 is received in detent 43.

The details of lock key assembly 25 are best seen with reference to FIGS. 5 and 6. Lock key assembly 25 includes a slide housing generally indicated by the numeral 44, a button assembly generally indicated by the numeral 45, and slidably received in housing 44, a face plate generally indicated by the numeral 46 and providing the surface which mates with plate 29 of master head 22, and a tubular coupler generally indicated by the numeral 47 which extends between and otherwise attaches housing 44 to plate 46.

Slide housing 44 includes a vertically extending pocket 48 therein to receive button assembly 45. A passageway 49 is formed in at least one of the opposed sidewalls 50 of housing 44, and the other adjacent sidewalls have an oval slot 51 formed therein.

Button assembly 45 includes an upper button 52 which extends out of the top of pocket 48 of housing 27. The lower end of button assembly 45 is formed as a pressure plate 53 with a cavity 54 being formed between the bottom of button 52 and plate 53. A pin 55 extends from button assembly 45 across the cavity 54 and through the slot 51 of housing 44. A coil spring 56 is received in the bottom of pocket 48 and bears against plate 53 thereby biasing button assembly 45 and button 52 upwardly as shown in FIG. 5.

Pin 55 carries one end of a cam arm, generally indicated by the numeral 57, by means of a slot 58 formed therein through which pin 55 passes. Cam arm 57 extends outwardly through passageway 49 in housing 44 and into a cavity 59 formed in coupler 47. A pin 60 is positioned in cavity 59, and pivotally carries the other end of cam arm 57. A cam surface 61 is formed on the extremity of the other end of cam arm 57.

A lock key plunger, generally indicated by the numeral 62, includes a body member 63 having a base plate 64 positioned at one end thereof, and a key, generally indicated by the numeral 65, positioned at the other end thereof. Plunger 62 is positioned in a lateral passageway 66 formed in coupler 47. Passageway 66 thus communicates with cavity 59 of coupler 47 on one side and a passageway having a bushing 67 positioned in face plate 46 on the other side. As shown, plunger 62 also extends through bushing 67.

Key 65 includes a neck 68 extending from body member 63, and a head 69, having a diameter larger than neck 68, is formed on the end of neck 68. Head 69 includes at least one beveled surface 70.

A coil spring 71 is positioned around body member 63 of plunger 62 and axially extends between bushing 67 and base plate 64. Spring 71 thus biases plunger 62 against the cam surface end 61 of cam arm 57 as shown in FIG. 5. However, upon the depression of button 52, plate 53 compresses spring 56 and pin 55 moves downwardly causing cam arm 57 to rotate counterclockwise (as oriented in the drawings) on pin 60. As such, cam surface 61 operates on base plate 64 to compress spring 71 and extend lock plunger 62 and, in particular, key 65, as shown in FIG. 6. Upon release of button 52, springs 56 and 71 return the components to the FIG. 5 position.

Although the tool changing system of the present invention may be manually operated, as will be hereinafter described, the present invention may include the docking station 26 which will automatically operate the system. Docking station 26 is somewhat schematically shown and includes a table 72 having an upper flat surface 73. Table 72 is supported by legs 74 which may be adjusted in a known manner to elevate surface 73 to the desired height. A stanchion 75 extends upwardly from table 72 and carries an actuator generally indicated by the numeral 76 which can be in the form of a pneumatic cylinder 77 having an extendable actuator rod 78. Stanchion 75 also carries another actuator generally indicated by the numeral 79 which may also be in the form of a pneumatic cylinder 80 having an actuator rod 81 which for alignment purposes, and to clear the robot 20, may be provided with an actuating arm 82. Table 72 also carries an actuator generally indicated by the numeral 83 which may also be in the form of a pneumatic cylinder 84 having an actuator rod 85. Table 72 is also provided with a plurality of upwardly extending locator pins 86 (one shown) which are received in apertures formed in the bottom of face plate 46 of lock key assembly 25 so as to assure that a tool head 24 carrying a lock key assembly 25 is properly located on table 72.

The docking station 26 may also be conveniently provided with a number of control features (not shown). For example, sensors could be provided in conjunction with the robotic program to verify that the proper, desired tool head 24 was positioned on table 72. In addition, docking station 26 may carry a logic control system to control the robot 20 and the actuators 76, 79 and 83, or these controls could be provided remotely.

Figure 7:
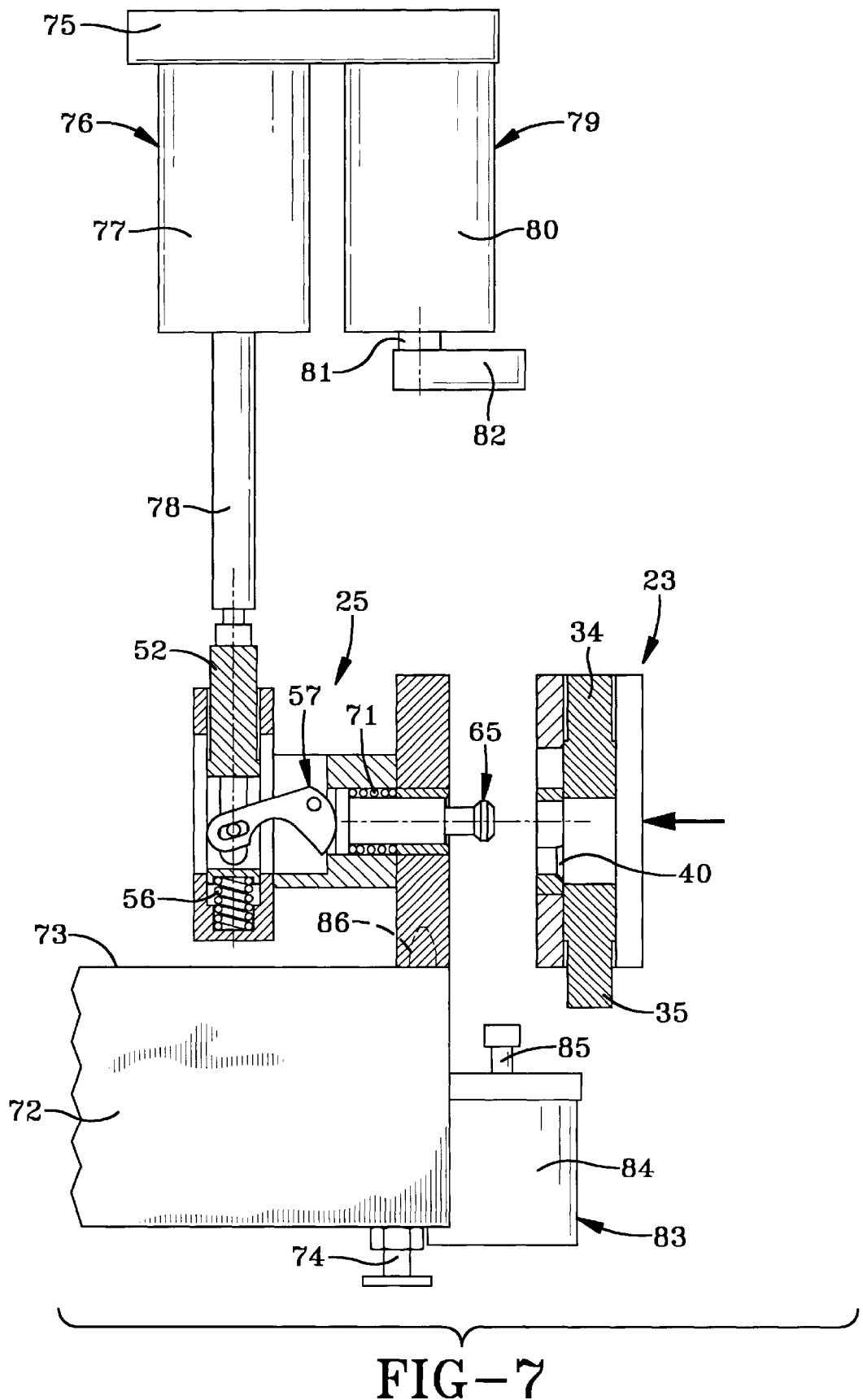
FIG. 7 is a somewhat schematic fragmented diagram showing the tool changing system in operation to attach a tool to the robot.

The operation of the system to attach a tool head 24 to the master head 22 of the robot 20 will now be described with reference to sequential FIGS. 7–10. FIG. 7 shows the lock key assembly 25 portion of a tool head 24 having been positioned on table 72 of docking station 26 and properly aligned by virtue of locator pins 86. Cylinder 77 has been activated to extend rod 78 and depress button 52 which, in a manner previously described, extends lock plunger 62 outwardly. The robot 20 carrying the locking mechanism 23 is shown by the arrow in FIG. 7 as approaching the docking station 26.

Figure 8:
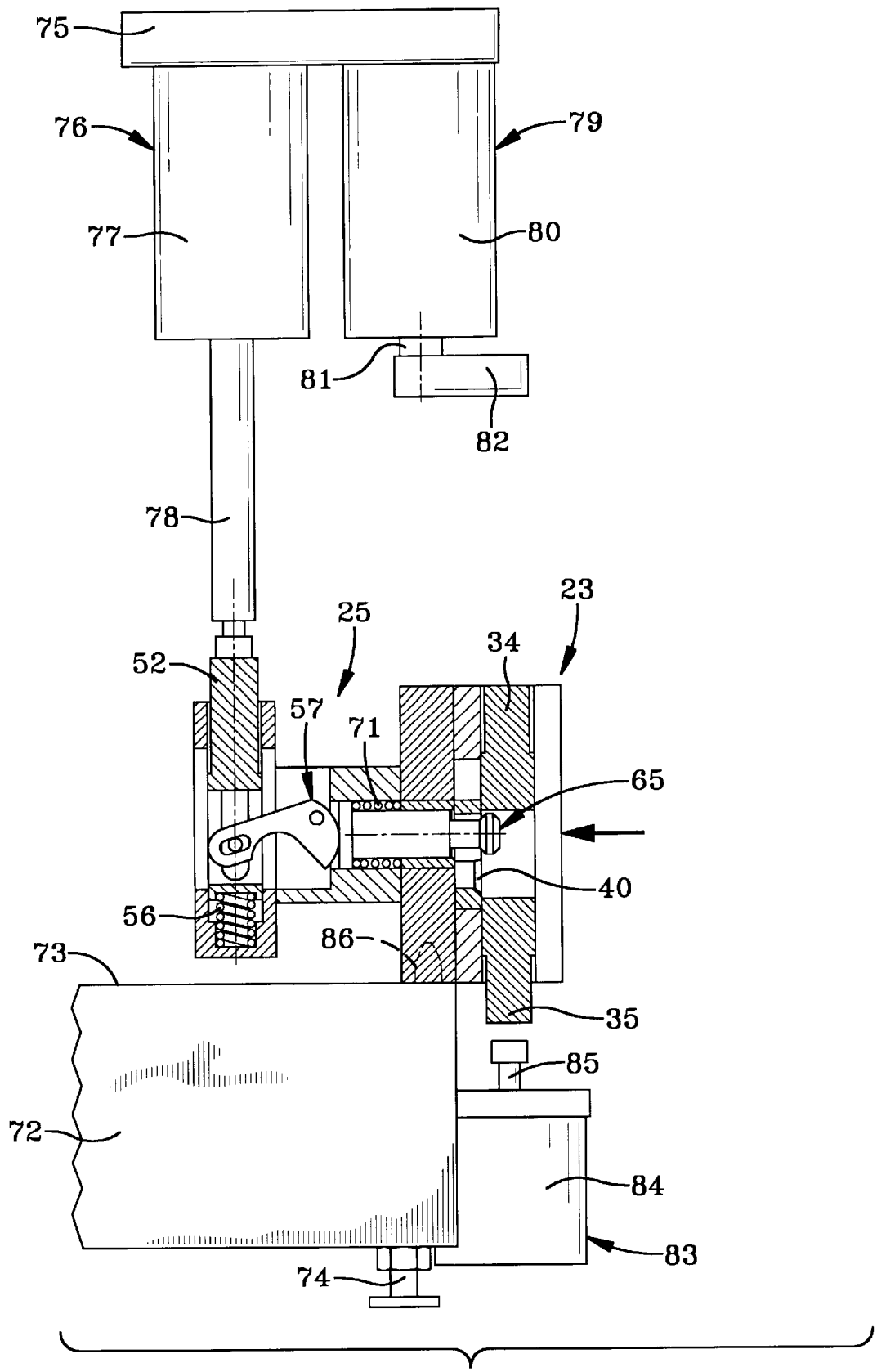
FIG. 8 is a view sequentially following FIG. 7 in the operation of the tool changing system.
Figure 9:
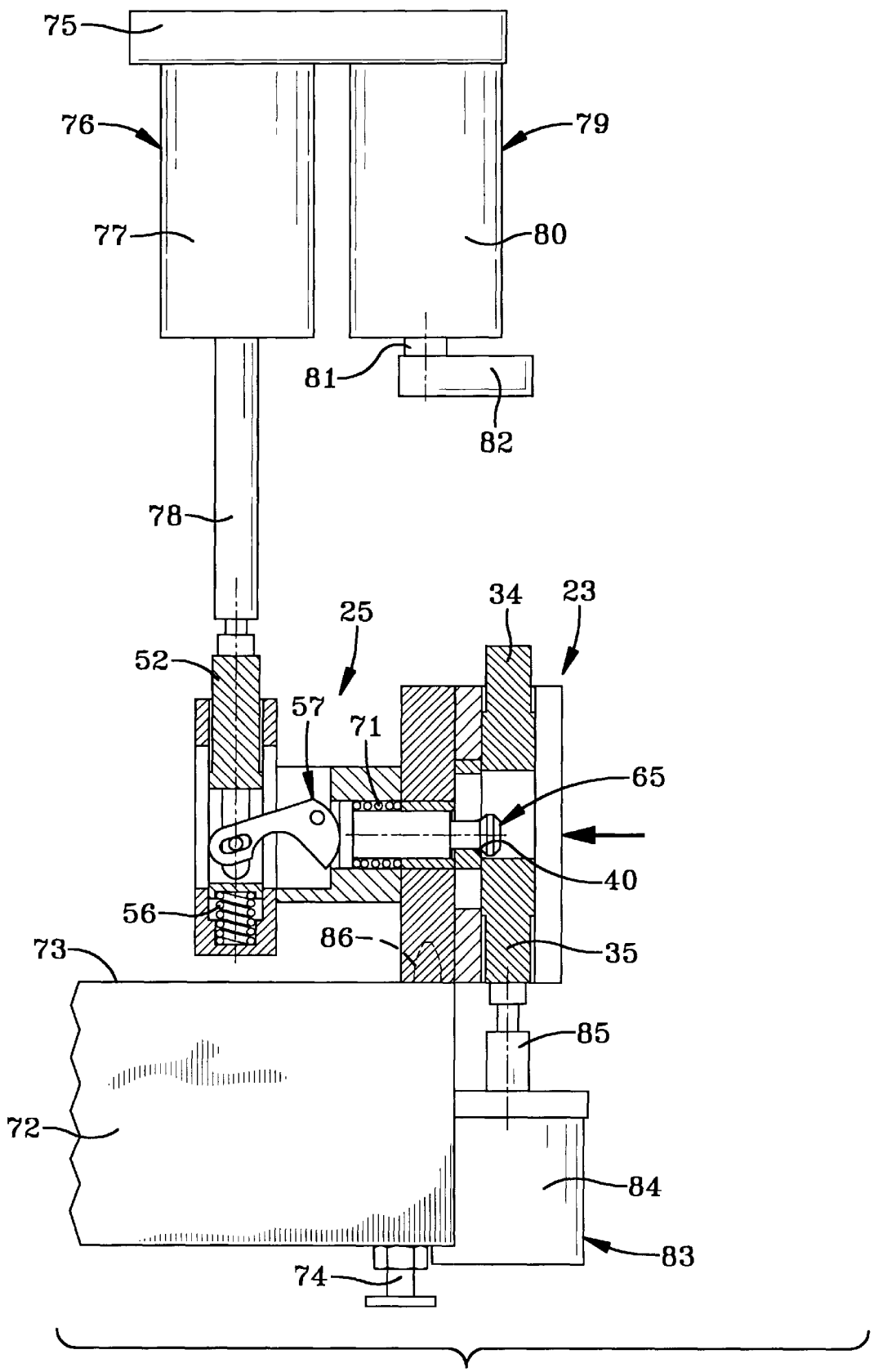
FIG. 9 is a view sequentially following FIG. 8 in the operation of the tool changing system.
Figure 10:
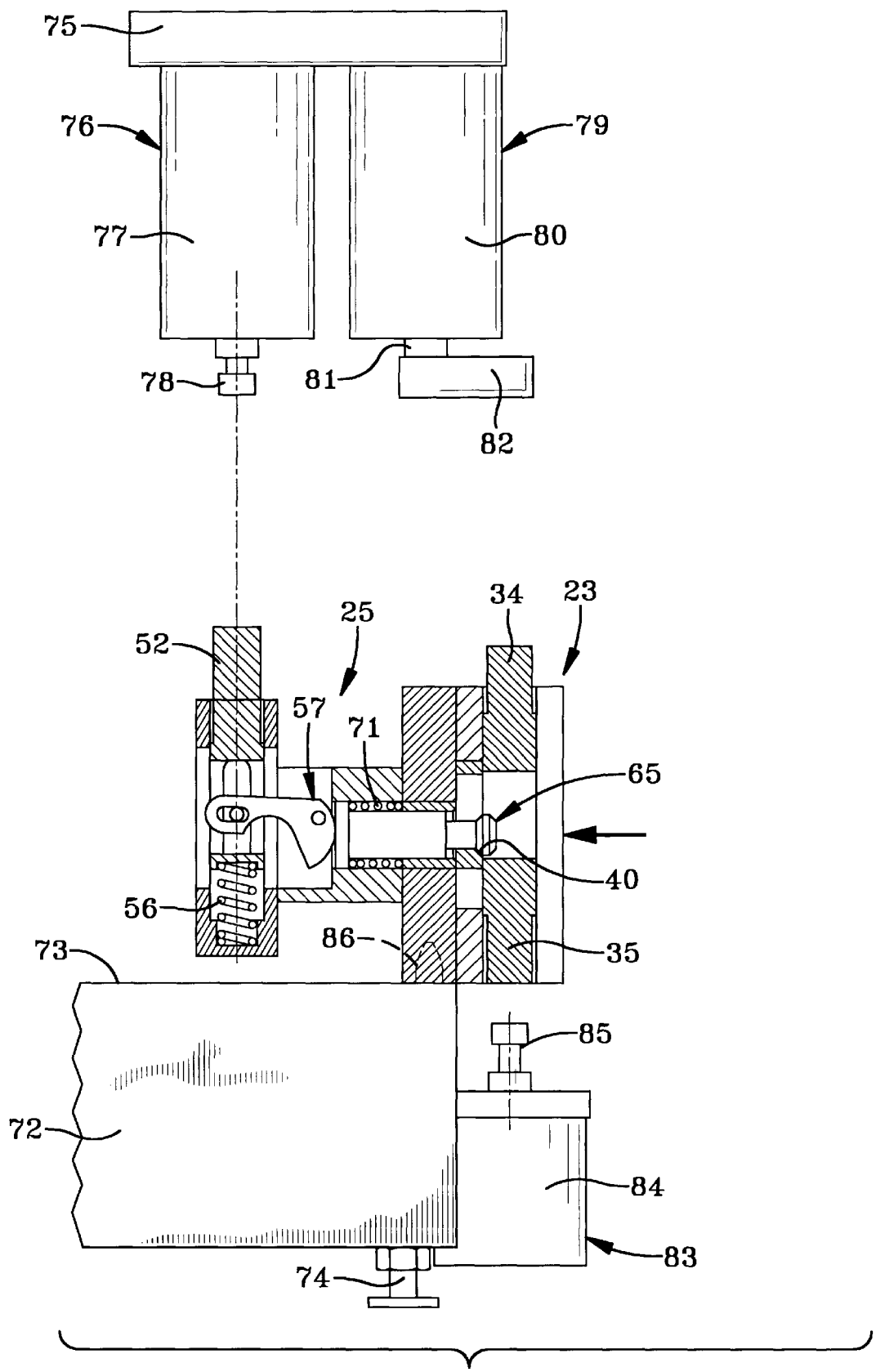
FIG. 10 is a view sequentially following FIG. 9 in the operation of the tool changing system.

FIG. 8 shows the position of the components after the locking mechanism 23 has reached the docking station 26. At this point, head 69 of plunger 62 has been received through the larger opening 38 of keyhole-shaped slot 37 of lock key assembly 25. Then, as shown in FIG. 9, actuator 83 is activated to extend rod 85 upwardly to engage lower button 35 of locking mechanism 23. As previously described, such moves lock slide 28 upwardly, and as a result, the smaller opening 39 is received around the neck 68 of key 65 to hold the key in the locking mechanism 23. Then actuators 76 and 83 are retracted which permits spring 56 to push button 52 upwardly rotating cam arm 57 which releases spring 71 to allow it to retract plunger 62. When such occurs, the beveled surface 70 of head 69 is pulled back into the beveled recess 40 of locking mechanism 23, and tool head 24 is attached to master head 22. Such a condition is shown in FIG. 10. Robot 20 may thus remove the tool head 24 from docking station 26 to begin its robotic functions.

Figure 11:
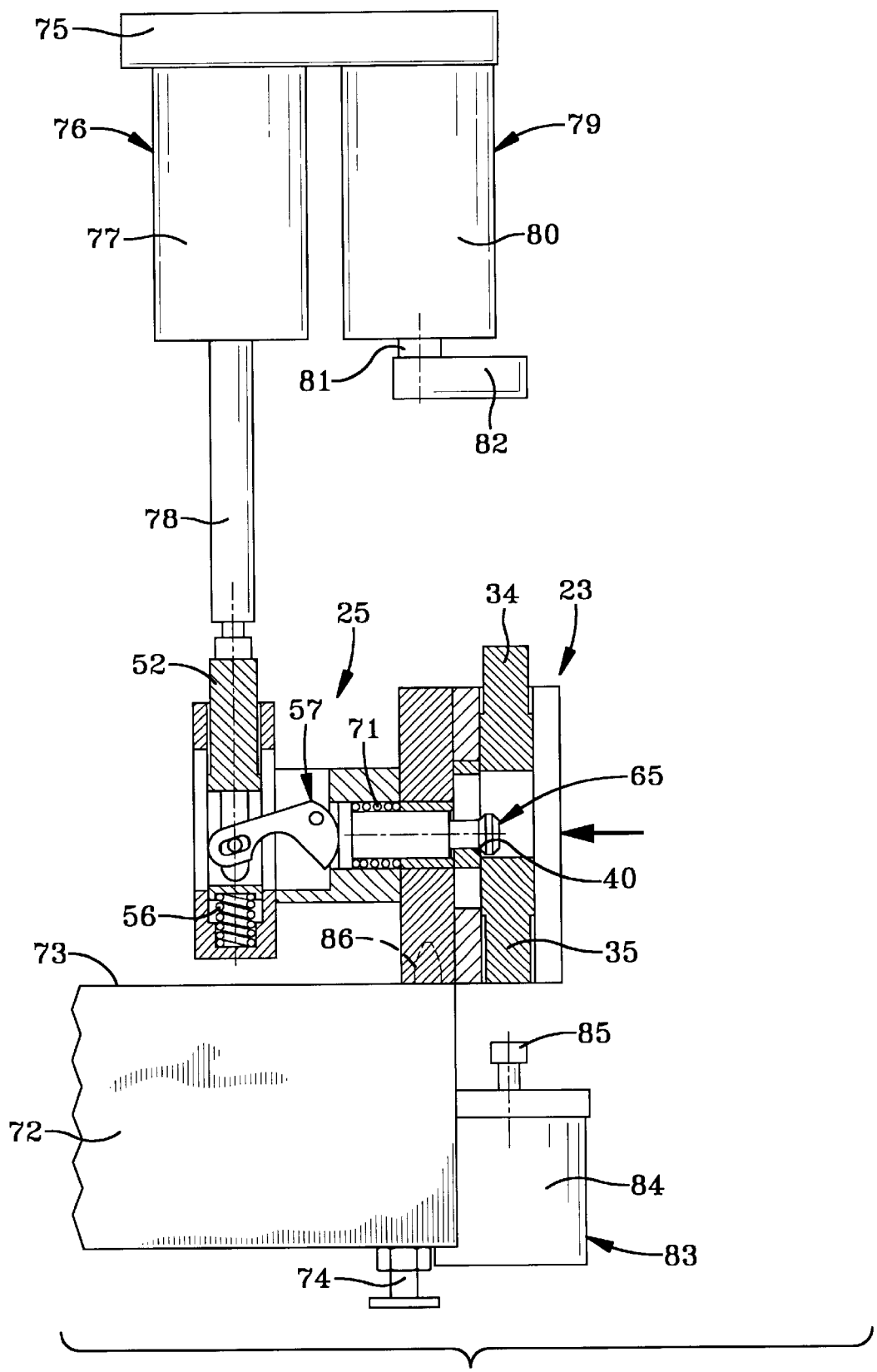
FIG. 11 is a somewhat schematic fragmented diagram showing the tool changing system in operation to detach a tool from the robot.
Figure 12:
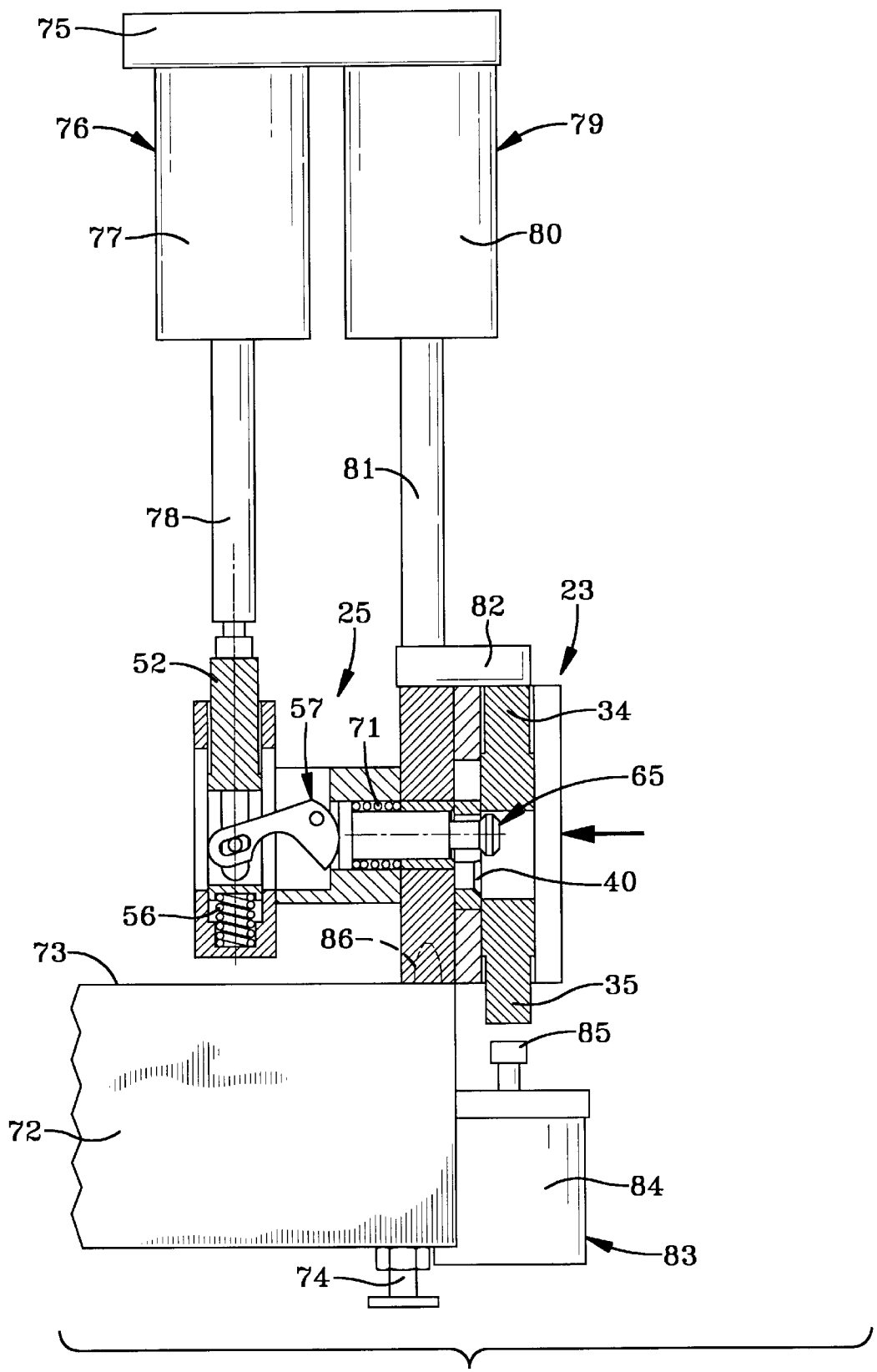
FIG. 12 is a view sequentially following FIG. 11 in the operation of the tool changing system.

In order to remove a tool head 24 from the master head 22, the robot 20 enters the docking station 26, and with the components in the position shown in FIG. 10, actuator 76 may be activated to depress button 52 to move plunger head 69 out of beveled recess 40 as shown in FIG. 11. Then actuator 79 is operated to engage upper button 34 of locking mechanism 23 as shown in FIG. 12. Such action moves lock slide 28 downwardly, and, as a result, the larger opening 38 of slot 37 is again positioned around key 65. At that time, arm 82 may be withdrawn by cylinder 84 and the robot 20 can leave the docking station 26 without a tool, if such is desired.

Thus, the tool changing system is controlled by the depression of buttons 34, 35 and 52 at the appropriate time and sequence, as discussed above. It should be appreciated that instead of such occurring automatically at a docking station 26, such could be accomplished manually without any change in the configurations of locking mechanism 23 or lock key assembly 25.

In view of the foregoing discussion, it should be evident that a system for quickly and easily changing the tool carried by a robot made in accordance with the present invention, as described herein, accomplishes the objects of the present invention and otherwise substantially improves the art.

What is claimed is:

1. A system for attaching a tool head to a robot comprising a locking mechanism adapted to be carried by the robot, said locking mechanism including a slot movable from a first position to a second position, an arcuate uniform depth beveled recess adjacent to said slot, and a key assembly on the tool head, said key assembly having a rotationally symmetric beveled key positionable in said slot when said slot is in said first position and held in said recess adjacent to said slot when said slot is in said second position.

2. The system according to claim 1 wherein said locking mechanism includes a housing and a slide member movable relative to said housing, said slide member having said slot.

3. A system for attaching a tool head to a robot comprising a locking mechanism adapted to be carried by the robot, said locking mechanism including a housing and a slide member having a slot, said slide member being movable relative to said housing so that said slot is movable from a first position to a second position, and a key assembly on the tool head, said key assembly having a key positionable in said slot when said slot is in said first position and held in said slot when said slot is in said second position, said slide member including first and second detents and said housing including a plunger, said plunger being received in said first detent to maintain said first position and being received in said second detent to maintain said second position.

4. A system for attaching a tool head to a robot comprising a locking mechanism adapted to be carried by the robot, said locking mechanism including a housing and a slide member having a slot, said slide member being movable relative to said housing so that said slot is movable from a first position to a second position, a key assembly on the tool head, said key assembly having a key positionable in said slot when said slot is in said first position and held in said slot when said slot is in said second position, said slide member having opposed first and second buttons, said first button being depressable to move said slot from said first position to said second position, and said second button being depressable to move said slot from said second position to said first position.

5. The system according to claim 2, said housing having a window to expose said slot.

6. The system according to claim 1 wherein said slot is keyhole-shaped including a first portion having a smaller dimension than a second portion.

7. The system according to claim 6 wherein said key is insertable through said second portion when said slot is in said first position, and wherein said key is positioned in said first portion when said slot is in said second position.

8. The system according to claim 1, said key including a neck portion and a head portion having a larger dimension than said neck portion, said head portion being positionable in said recess.

9. The system according to claim 7 wherein said key includes a neck portion and a head portion having a larger dimension than said neck portion, said head portion being receivable through said second portion but not said first portion.

10. The system according to claim 9 wherein said neck portion is receivable in said first portion when said slot is in said second position.

11. A system for attaching a tool head to a robot comprising a locking mechanism adapted to be carried by the robot, said locking mechanism including a slot movable from a first position to a second position, and a key assembly on the tool head, said key assembly having a key and including a cam assembly to move said key into said slot when said slot is in said first position, said key being held in said slot when said slot is in said second position.

12. The system according to claim 11 wherein said cam assembly includes a cam arm having a surface bearing against said key.

13. The system according to claim 12 wherein said cam arm is pivotable about a pin near one end thereof, said cam assembly including a slide member operatively connected to said cam arm near the other end thereof.

14. The system according to claim 13 wherein said slide member includes a button which upon depression thereof pivots said cam arm on said pin to move said key to be received in said slot.

15. The system according to claim 14 wherein said key assembly includes a first spring to pivot said cam arm on said pin upon release of said button and a second spring to move said key out of said slot.

16. The system according to claim 15 further comprising a docking station which can carry the tool head.

17. The system according to claim 16 further comprising means to locate the tool head at said docking station.

18. The system according to claim 16 further comprising a first actuator positioned at said docking station to move said key into said slot.

19. The system according to claim 18 further comprising a second actuator positioned at said docking station to move said slot from said first position to said second position.

20. The system according to claim 19 further comprising a third actuator positioned at said docking station to move said slot from said second position to said first position.

21. A method of attaching a tool head having a key to a locking mechanism carried by a robot comprising the steps of depressing a first button to extend the key to a first position to be received by the locking mechanism, depressing a second button to hold the key at a second position in the locking mechanism, and releasing the buttons to attach the tool head to the locking mechanism.

22. The method according to claim 21 wherein the step of releasing the buttons moves the key to a third position in the locking mechanism.

23. The method according to claim 22 further comprising the step of detaching the tool head from the locking mechanism.

24. The method according to claim 23 wherein the step of detaching includes the step of depressing the first button to move the key from the third position to the second position.

25. The method according to claim 24 wherein the step of detaching includes the step of depressing a third button to move the key from the second position to the first position.

* * * * *